US007313826B2

(12) United States Patent
Reasons et al.

(10) Patent No.: US 7,313,826 B2
(45) Date of Patent: *Dec. 25, 2007

(54) CONNECTED SUPPORT ENTITLEMENT SYSTEM METHOD OF OPERATION

(75) Inventors: John D. Reasons, Broadview Heights, OH (US); James L. Vineyard, San Diego, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/540,161

(22) Filed: Sep. 29, 2006

(65) Prior Publication Data

US 2007/0033658 A1 Feb. 8, 2007

Related U.S. Application Data

(63) Continuation of application No. 10/229,909, filed on Aug. 27, 2002, now Pat. No. 7,162,744.

(51) Int. Cl.
  *G06F 7/04* (2006.01)
  *G06F 17/30* (2006.01)
  *G06K 9/00* (2006.01)
  *H04L 9/00* (2006.01)

(52) U.S. Cl. ........................................ 726/27; 713/168
(58) Field of Classification Search .................... 726/27
See application file for complete search history.

(56) References Cited

U.S. PATENT DOCUMENTS

| | | | |
|---|---|---|---|
| 4,405,829 A | 9/1983 | Rivest et al. | |
| 5,136,643 A | 8/1992 | Fischer | |
| 5,283,830 A | 2/1994 | Hinsley et al. | |
| 5,313,521 A | 5/1994 | Torii et al. | |
| 5,319,710 A | 6/1994 | Attala et al. | |
| 5,349,642 A | 9/1994 | Kingdon | |
| 5,371,794 A | 12/1994 | Diffie et al. | |
| 5,483,596 A | 1/1996 | Rosenow et al. | |
| 5,495,533 A | 2/1996 | Linehan et al. | |
| 5,602,918 A | 2/1997 | Chen et al. | |
| 5,717,756 A | 2/1998 | Coleman | |
| 5,784,463 A | 7/1998 | Chen et al. | |
| 5,825,877 A | 10/1998 | Dan et al. | |
| 5,999,978 A | 12/1999 | Angal et al. | |
| 6,154,741 A | 11/2000 | Feldman | |
| 6,802,007 B1 | 10/2004 | Canelones et al. | |
| 7,162,744 B2 * | 1/2007 | Reasons et al. ............... | 726/27 |
| 2002/0112186 A1 | 8/2002 | Ford et al. | |
| 2002/0138727 A1 | 9/2002 | Dutta et al. | |
| 2003/0088786 A1 | 5/2003 | Moran et al. | |

OTHER PUBLICATIONS

Microsoft Computer Dictionary, 5th Edition, 2002, Microsoft Press, p. 182.

* cited by examiner

*Primary Examiner*—Syed A. Zia
*Assistant Examiner*—Christian LaForgia
(74) *Attorney, Agent, or Firm*—TraskBritt

(57) ABSTRACT

An entitlement system and method for computers allowing controlled access to operating systems, software applications, data, or hardware for a computer system. More particularly, the entitlement system involves localized control to access computer operations, including operating systems, software, internet access, data, hardware, or the like, which may be updated remotely, such as through the Internet. The local control of entitlement rights releases overused system and communication resources, providing a more efficient validation method for computer-controlled operations.

17 Claims, 3 Drawing Sheets

CONNECTED SUPPORT ENTITLEMENT SYSTEM METHOD OF OPERATION

CROSS-REFERENCE TO RELATED APPLICATION

This application is a continuation of application Ser. No. 10/229,909, filed Aug. 27, 2002, now U.S. Pat. No. 7,162,744, issued Jan. 9, 2007.

BACKGROUND OF THE INVENTION

1. Field of the Invention

The present invention relates to an entitlement system and method for allowing access to operating systems, software applications, data, or hardware for a computer system. More particularly, the present invention involves a localized entitlement system for controlling access to computer operations, including operating systems, software, internet access, data, hardware, or the like, which may be updated remotely, such as through the Internet.

2. State of the Art

Computers have become commonplace in society. Network systems, personal computers, and laptop computers remind us of the classical image of a computer—a machine having a specific identity. Today, however, computers and microprocessors are integrated with many of the items used on an everyday basis such as cellular phones, personal data assistants, and vehicles. Internet capabilities are rapidly being added to such computers and microprocessors.

As Internet capabilities proliferate, the systems accessible through the Internet experience a greater amount of traffic, straining resources, bandwidth and system capabilities. Much of the strain on the systems results from the methods used to provide users access to data or executable functions over the Internet. For example, many Internet companies require users to log on to their system in order to access system data, access user data, or access and execute programs offered by the particular Internet company. Once the user is logged on, the user must typically remain logged on to use the services provided by the system. Each user, therefore, expends valuable system resources while logged on. As the number of users increases, the system resources are further taxed. The system may slow down, or become unavailable to other users, because the system resources are used to maintain secure connections with those users that are currently logged on to the system. At times, users wishing to log on to the system may even be denied access because so many other users are currently using the system. Therefore, a localized entitlement system allowing a user access to services offered by an Internet system may be desirable.

Furthermore, because a user must be logged on to the system to use the services provided, a user is unable to use the services off-line. In some instances, a user may wish to use certain services off-line, rather than while connected to the service provider via the Internet. This may be especially true if a user is having difficulty staying connected to a system due to heavy Internet traffic or Internet service provider (ISP) connection problems. A localized method of determining entitlement to a service could eliminate the need to log on to an Internet system to use the services.

Another problem typically associated with computer usage is the rampant abuse of software license agreements. Separate installations of the same software may be used concurrently on numerous computers in violation of a license agreement. A method of determining whether or not the particular machine, or user, is entitled to use the software may be advantageous. In addition, a method of preventing the use of software after a software license has expired could also be advantageous.

Government use, business use, educational use, and personal use of computers will continue to expand as additional computer systems are integrated into our everyday lives. As use increases, Internet use will also increase. Therefore, efficient methods of dealing with the increased Internet traffic, more efficient methods for handling secure information, and validation methods for confirming the rights to use software, hardware, or other computer functions are desirable.

BRIEF SUMMARY OF THE INVENTION

In general, the present invention relates to an entitlement system and method for allowing access to operating systems, software applications, data, or hardware for a computer system. More particularly, the present invention involves a localized entitlement system for controlling access to computer operations, including operating systems, software, internet access, data, hardware, or the like, the entitlement system being updated using the Internet or dedicated connection.

The entitlement system of the present invention validates access to a user-desired operation based upon encrypted keys stored in the system registry of a local computer. User-desired operations may include the launching, initiation, or operation of a software program, obtaining access to a hardware system or operating system, activation of an embedded function, or other tasks which may be performed using a microprocessor or computer. Selection of a user-desired operation initiates an entitlement routine. First, the entitlement routine identifies the user-desired operation being requested. Every user-desired operation is assigned a unique identifier, or FunctionID, which may be passed to the entitlement routine. Receipt of the FunctionID allows the entitlement routine to identify the user-desired operation and determine whether entitlement keys exist for that particular user-desired operation. If entitlement keys for the user-desired operation exist in the system registry, they are decrypted. Decryption occurs using Public/Private key decryption methods as known in the art. The public key for decrypting the entitlement keys is also stored in the system registry. However, the entitlement system of the present invention usually stores the public key in separate encrypted parts which must also be decrypted before use. The encryption of the public key is based upon an identifier unique to the computer hosting the entitlement routine, such as a global unique identifier (GUID) for the local computer. The public key is decrypted by the entitlement system using the global unique identifier. Once decrypted, the public key is used to decrypt the entitlement keys.

Operating with the decrypted entitlement keys, the entitlement routine returns an entitlement value indicating that entitlement rights to the user-desired operation exist or do not exist. If entitlement rights exist, the user-desired operation is executed. If the entitlement keys are not decrypted properly, if the entitlement keys indicate an invalid entitlement, or if the entitlement keys are nonexistent for the selected user-desired operation, an entitlement server is contacted to obtain updated entitlement information or to create an entitlement profile for the user.

The entitlement server may be a remote system which may be accessed by clients, or local computers. The entitlement server may be a server on a network, a computer accessed via the internet, a computer accessed via a direct communications link, or other computer separate and distinct from a local or client machine running an entitlement routine. The entitlement server allows a user to update entitlement rights or obtain entitlement rights for new or previously unused user-desired operations.

When an entitlement routine on a local computer determines a negative condition for entitlement, the entitlement server is contacted by the local computer. By way of example, the entitlement server is contacted through an Internet connection. However, where the entitlement server is accessible by other communication options, such as by direct connection, a local area network, modem, or otherwise, such other communications may be utilized. Once communication is established between the local computer and the entitlement server, a unique identifier, such as a GUID, is passed from the local computer to the entitlement server. The unique identifier is unique to the local computer such that the entitlement server is able to positively identify the local computer. The entitlement routine also passes the identification of the user-desired operation to the entitlement server. The entitlement server compares the unique identifier and user-desired operation from the local computer to data available to the entitlement server to determine entitlement status. If the local computer is entitled to access the user-desired operation, new entitlement keys are generated by the entitlement server, encrypted, and transmitted back to the local computer where the encrypted keys are stored in the system registry of the local computer. The communication between the entitlement server and the local computer is terminated and the user-desired operation is launched. Alternatively, a unique identifier may identify a user rather than a computer or machine.

In those instances where entitlement is not verified by the entitlement server, the entitlement server redirects the local computer to a particular activity. This may include, but is not limited to, informing the user of the local computer of the failed entitlement and disengaging communications between the entitlement server and local computer or redirecting the local computer to communications with a commerce engine where the user of the local computer may resubscribe or obtain entitlement rights to the requested user-desired operation. In such instances, new entitlement keys are created and stored on the system registry of the local machine. In addition, if a user record does not exist on the entitlement server for the selected user-desired operation, the commerce engine may create the record from data obtained from the user of the local computer.

BRIEF DESCRIPTION OF THE SEVERAL VIEWS OF THE DRAWINGS

While the specification concludes with claims particularly pointing out and distinctly claiming that which is regarded as the present invention, the invention can be more readily ascertained from the following description of the invention when read in conjunction with the accompanying drawings in which:

DETAILED DESCRIPTION OF THE INVENTION

Figure 1:
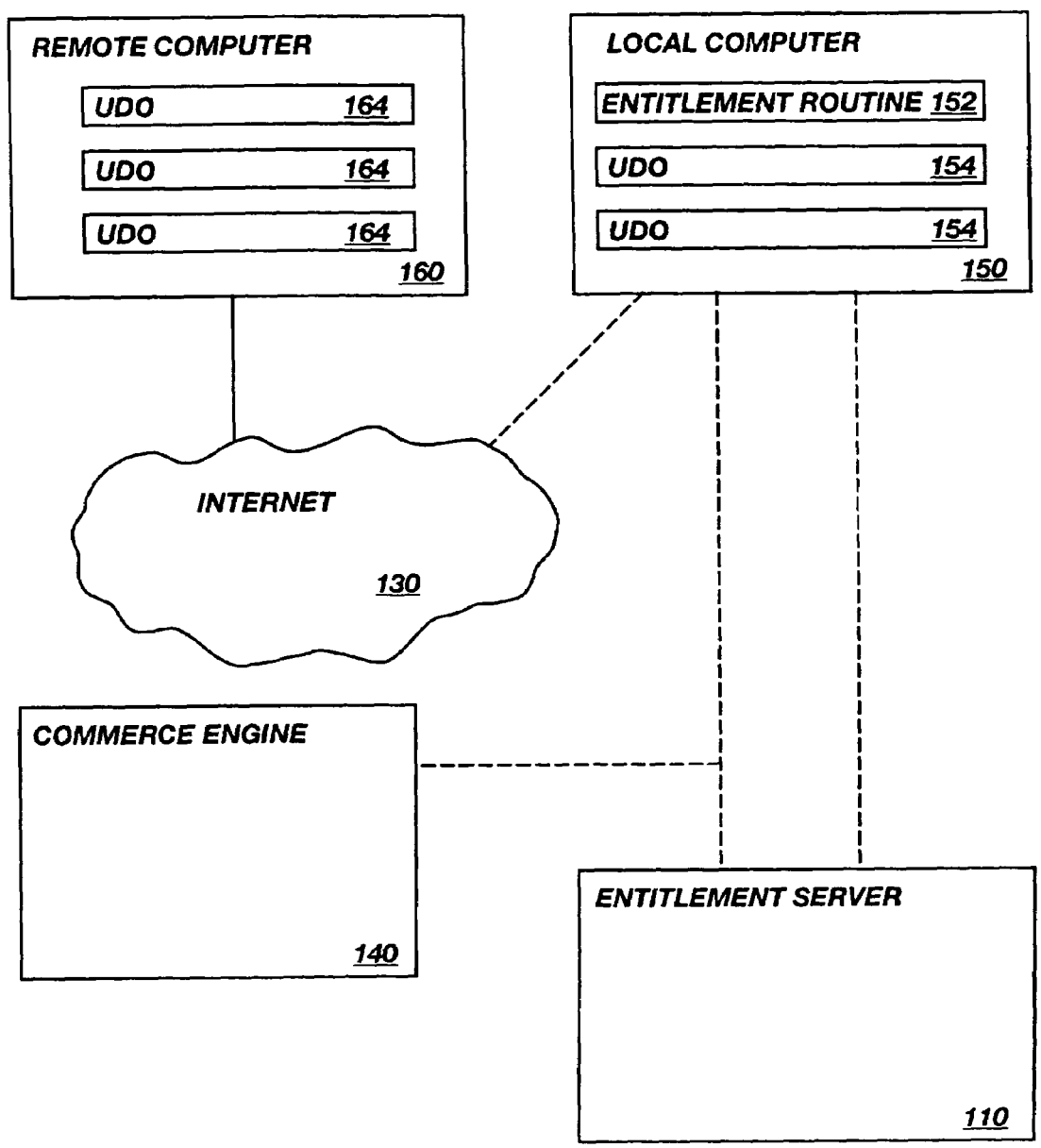
FIG. 1 is a block diagram illustrating computer components that may be used to carry out the entitlement system of the present invention.

The present invention relates to an entitlement system and method for allowing controlled access to operating systems, software applications, data, or hardware for a computer system. More particularly, the present invention involves a localized entitlement system for controlling access to computer operations, including operating systems, software, Internet access, data, hardware, or the like, which may be updated through a remote system such as the Internet.

Entitlement to a computer-controlled operation is essentially permission or authorization to use that particular operation. In some instances, a user or computer may be entitled to execute a computer-controlled operation, such as the running of a software program. This commonly occurs when a valid license agreement for the software exists or when the user has been given certain access rights to the computer-controlled operation. In other instances, the user or computer may not be entitled to execute a computer-controlled operation, such as when a license for software use has expired or when access rights to the computer-controlled operation have not been granted. The entitlement system of the present invention may be used to assign entitlement rights to a computer or user, verify the existence of entitlement rights to certain computer-controlled operations, and direct a user or computer to other computers for the purpose of obtaining additional entitlement rights.

The entitlement system of the present invention may include a number of components. Typically, a client engine, or local computer, stores or accesses a localized entitlement routine. The entitlement routine may be, for example, a dynamic link library (DLL) having a plurality of functions that may be carried out by the entitlement system. Alternatively, the entitlement routine may include any function or program for carrying out the present invention and may be customized for a particular operating system. User-desired operations may also be stored or accessed by the local computer. A user-desired operation is a computer-controlled operation and includes, but is not limited to, the execution of an operating system function, the execution of a software application, accessing stored data, performing a hardware function, or other tasks performed by a computer. For example, a local computer having a graphical user interface displays as icons a number of software programs accessible to the local computer. The selection of one of the icons, such as by double clicking on the icon, prompts the local computer to execute the software program represented by the selected icon. Execution of the software program represents a user-desired operation. By clicking on the icon, the user desires to execute the represented software program. If the software program is associated with the entitlement system, the click event triggers the entitlement routine of the present invention.

Similarly, a user-desired operation may be the operation of hardware connected to a local computer, such as a color printer. Requests for print jobs to the particular color printer may be associated with the entitlement system to limit printer access to those authorized to print to that particular printer. Thus, the user-desired operation is a print job. Likewise, data access may be controlled using the present invention. Data stored or available to a local computer may be associated with the entitlement system, thereby limiting access to only those that are entitled to the data. Requesting access to view such data constitutes a user-desired operation. In addition, the user-desired operation may be hosted on a remote computer in communication with the local computer, such as over an Internet connection.

The entitlement system also includes an entitlement server for checking entitlement status of a user-desired operation, updating entitlement rights for a user-desired operation, and directing a local computer to a commerce engine to obtain entitlement rights to a user-desired operation, through purchase or otherwise. The local computer and the entitlement server are capable of communicating with each other, whether by network connection, phone/modem line connection, via the Internet, or other communication link or combination of links capable of enabling the communication between two computers.

To function, the entitlement system of the present invention relies upon the existence of an entitlement routine being present on the local computer. Thus, before the entitlement system operates, an entitlement routine must be loaded on the local computer. This may occur at the time entitlement rights to a user-desired operation are obtained, or by actively loading the entitlement routine onto a storage medium accessible to the local computer. Alternatively, the entitlement routine may be included with a software package such that it is automatically loaded and registered at the time the software is loaded into a local computer. This includes the transfer of an entitlement routine to a local computer upon the selection of a hyperlink in a browser window.

The localized entitlement routine stored as a DLL on the local computer includes a number of functions to obtain or validate the entitlement status for a user-desired operation accessed by the local computer. Typically, the entitlement routine functions include functions for checking the entitlement status of a user-desired operation; functions for redirecting the local computer to the entitlement server if entitlement to a user-desired operation is not validated; functions for updating entitlement; functions for removing entitlement from the local computer; functions for retrieving information or data about the local computer or user of the local computer; and functions for manipulating and operating the DLL functions of the entitlement routine.

In one embodiment of the present invention, the localized entitlement routine includes the following functions: Perform, CheckEntitlement, CheckEntitlementCSC, RedirectPath, UpdateFunction, RemoveFunction, and GetUserData. The function Perform acts as the primary entry point for the entitlement system. A user-desired operation first calls the Perform function to initiate the entitlement status. The functions CheckEntitlement and CheckEntitlementCSC may be used to determine whether or not the selected user-desired operation is entitled at the time of selection. The function RedirectPath is called by the CheckEntitlement or CheckEntitlementCSC function if the user-desired operation is not entitled on that particular local computer and it provides the path for the local computer to connect to the entitlement server for entitlement updating and error handling. The UpdateFunction is called by the entitlement server to build or update the entitlement information on the local computer for a particular user-desired operation. The RemoveFunction removes entitlement information from a local computer and is generally initiated or called by the entitlement server. The GetUserData function is called by the entitlement server to obtain information about the local machine so that the local machine may be properly identified and the entitlement status of the user-desired operation may be checked. Some or all of these functions may be called after the selection of a user-desired operation and the entitlement routine is loaded.

User-desired operations associated with the entitlement system of the present invention include preprogrammed calls to the localized entitlement routine. Upon selection of a user-desired operation by a user, the entitlement routine is executed. Upon execution, data may be passed from the user-desired operation to the entitlement routine so that the entitlement status of the user-desired operation may be determined. For example, a FunctionID specific to the user-desired operation may be passed in a call to the entitlement routine to identify which user-desired operation is requesting entitlement. Similarly, data may be passed from the local machine to the user-desired operation. Based upon the received FunctionID, the entitlement routine checks the status of the entitlement for the user-desired operation. If the user-desired operation is entitled, the user-desired operation is executed. If the user-desired operation is not entitled, the entitlement routine redirects the local computer to an entitlement server for entitlement verification, entitlement updates, or otherwise.

The entitlement system of the present invention is further explained with reference to the illustrations in FIGS. 1 through 3. FIG. 1 illustrates exemplary communication paths between a local computer 150, an entitlement server 110, a remote computer 160, the Internet 130, and a commerce engine 140. Dashed lines indicate a temporary communication link between the components illustrated.

Local computer 150 includes an entitlement routine 152 stored in the memory of, or otherwise accessible to, the local computer 150. User-desired operations 154 (UDOs 154 in FIG. 1) are also stored in the memory of, or are otherwise accessible to, the local computer 150. User-desired operations 164 (UDOs 164 in FIG. 1) may also be stored on a remote computer 160. For instance, remote computer 160 is accessible to local computer 150 through Internet 130. A local computer 150 user accessing the remote computer 160 through the Internet 130 may choose any one of the user-desired operations 164 hosted by the remote computer 160. Alternatively, the remote computer 160 may only host hyperlinks associated with user-desired operations 164. Selection of the hyperlinks hosted by the remote computer 160 call the entitlement routine 152 to determine entitlement before providing the local computer 150 access to the user-desired operation 164.

Entitlement server 110 comprises a computer, server, or computer system accessible by local computers 150. The entitlement server 110 maintains entitlement records for user-desired operations, verifies entitlement rights to user-desired operations, creates entitlement keys for user-desired operations, and redirects nonentitled users to commerce engines 140 or other computers where entitlement rights may be obtained.

Entitlement records accessible to the entitlement server 110 typically comprise one or more databases of information about each user or local computer 150 that is, or was, entitled to use the user-desired operations associated with the entitlement system. For example, a client record in a database may include the user name, an account number, a network globally unique identifier, a machine identifier, the maximum number of clients allowed, a FunctionID for a user-desired operation, and an expiration date for entitlement of the user-desired operation. Information of this type is accessed to verify entitlement records for individual users or local computers 150. In addition, entitlement records may also include databases containing information about each user-desired operation associated with the entitlement system, such as the user-desired operation's FunctionID, a commerce engine associated with the user-desired operation and other such information. Using the data from the databases accessible to the entitlement server 110, entitlement to a user-desired operation may be checked.

Commerce engine 140 typically comprises a computer or computer system for selling or allocating entitlement rights to a user-desired operation. Once entitlement rights to a user-desired operation are assigned by the commerce engine, data regarding the entitlement rights, such as that stored in a client record, may be transferred to the entitlement server 110 for future use.

Generally, a remote computer 160 is a server upon which Internet compatible documents, functions, and programs are stored. A local computer 150 accessing a remote computer 160 through the Internet 130 using a web browser is typically presented with a series of hyperlinks which represent user-desired operations 164. Using the browser operating on the local computer 150, a user may opt to launch one of the user-desired operations 164 stored on the remote computer 160 by clicking on the associated hyperlink. Selection of a user-desired operation 164 triggers the entitlement system of the present invention.

Figure 2:
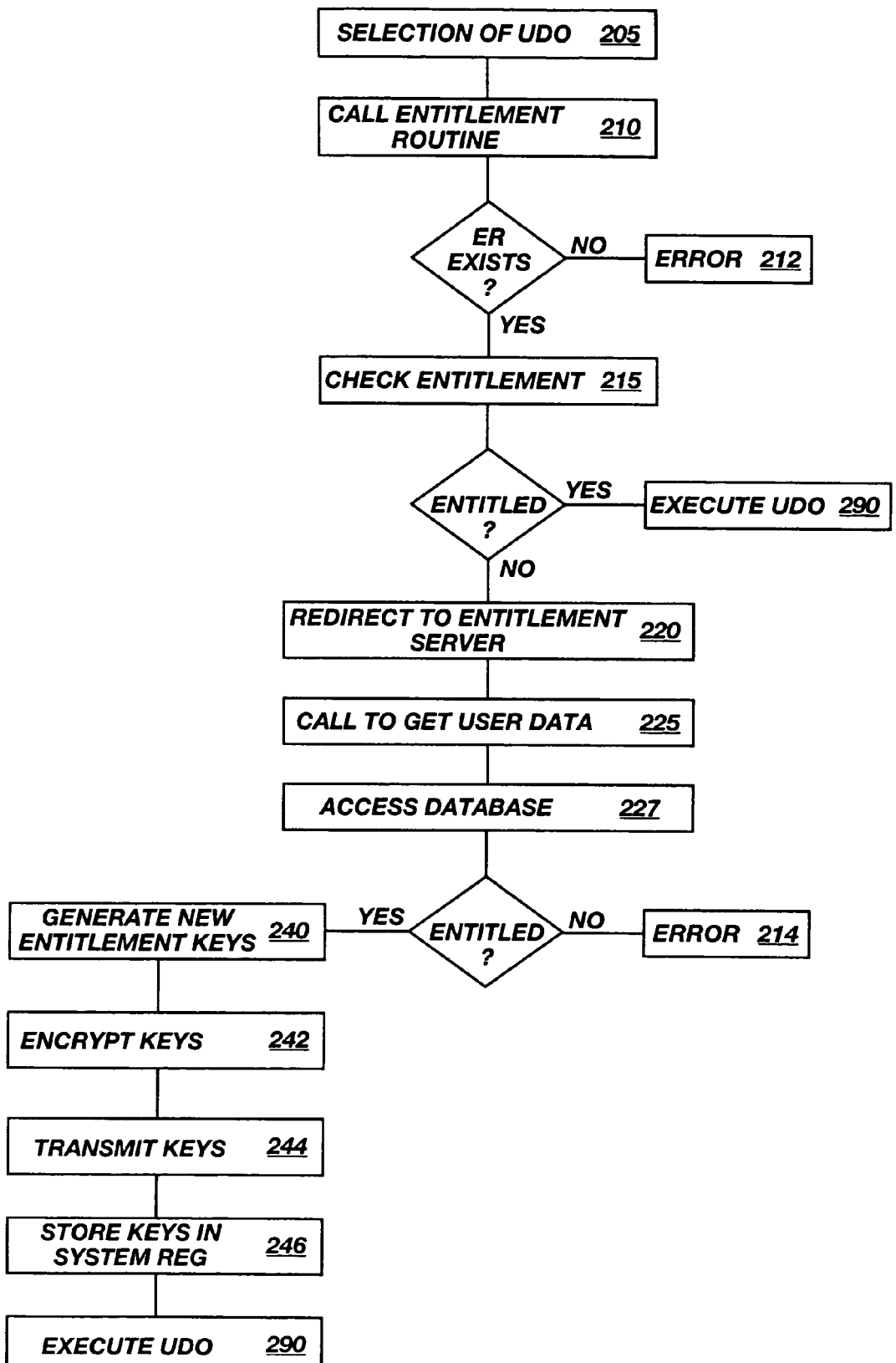
FIG. 2 is a block diagram illustrating the process steps of the entitlement system of the present invention.
Figure 3:
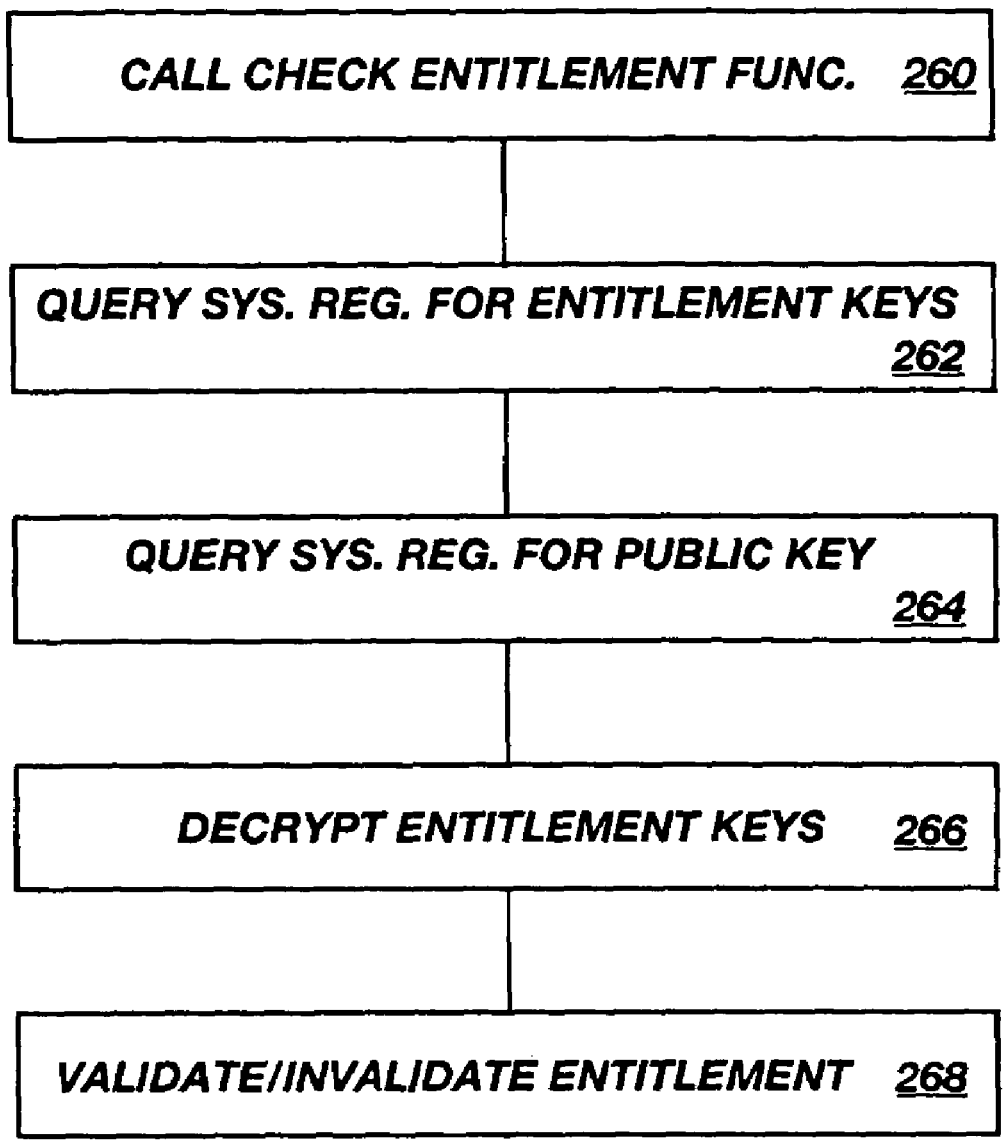
FIG. 3 is a block diagram illustrating the process steps used to check for entitlement of a user-desired operation.

A simple block diagram of the acts performed by the entitlement system in response to the selection of a user-desired operation is illustrated in FIG. 2, which will be described in conjunction with FIG. 1. The entitlement system is initiated by the selection 205 of a user-desired operation associated with the entitlement system. User-desired operations associated with the entitlement system are initiated with a call 210 to an entitlement routine 152 once selected. If the entitlement routine 152 exists and is accessible on the local computer 150, the entitlement system begins the process of checking entitlement 215 for the selected user-desired operation. If the entitlement routine 152 does not exist, or is inaccessible to the local computer 150, an error 212 occurs. If the local computer 150 is entitled to the selected user-desired operation, the user-desired operation (UDO) is executed 290. If the local computer 150 is not entitled to the user-desired operation, the local computer 150 is redirected 220 or connected to an entitlement server 110. Once connected with a local computer 150, the entitlement server 110 calls the GetUserData function 225 of the entitlement routine 152 to obtain information about the local computer 150. Using the data obtained from the GetUserData call 225, the entitlement server 110 accesses a database 227 to determine if the selected user-desired operation should be entitled on the local computer 150. If entitlement is verified, new entitlement keys are generated 240, encrypted 242, and transmitted 244 to the local computer 150 where they are stored 246 in the system registry. The selected user-desired operation is then executed 290 by the local computer 150. If entitlement is not verified by the entitlement server 110, an error 214 is produced.

Depending upon the type of user-desired operation selected, the step of calling 210 the entitlement routine 152 may vary. For instance, the entitlement routine 152 may be called by a software program chosen as the user-desired operation, or by a function within a software program, such as by a print function. Alternatively, the entitlement routine 152 may be called using Internet- or web-based hyperlinks.

A call 210 to an entitlement routine 152 by a software program usually occurs once the software is selected. A software program associated with the entitlement system of the present invention typically includes a call 210 to the entitlement routine 152 prior to performing the main routines and functions of the software program. Alternatively, a call to an entitlement routine 152 may occur during operation of the software program. For example, if a user chooses to print a document to a color printer associated with the entitlement system, the print function calls 210 the entitlement routine 152 to verify entitlement to print on the chosen printer. Thus, entitlement to the use of computer hardware may be controlled using the entitlement system of the present invention.

A call 210 to an entitlement routine 152 may also occur using a hyperlink embedded in a web page, such as a hyperlink on an Internet web page or an intranet web page. For instance, a local computer 150 accessing a remote computer 160 through the Internet 130 is typically presented with a number of hyperlinks. Each hyperlink may represent a different user-desired operation 164 associated with the entitlement system of the present invention. However, selection of a hyperlink representing a user-desired operation 164 does not execute the user-desired operation 164. Instead, the hyperlink calls 210 the entitlement routine 152 on the local computer 150 and passes a FunctionID unique to the selected user-desired operation 164 to the entitlement routine 152. Based upon the FunctionID, the entitlement routine 152 determines whether or not the local computer 150 is entitled to the selected user-desired operation 164. If the local computer 150 is entitled to user-desired operation 164 selected, valid entitlement keys associated with the FunctionID are stored in the system registry of the local computer 150. If entitlement exists, the local computer 150 is redirected to a uniform resource locator (URL) path containing the user-desired operation 164 associated with the hyperlink. The URL is typically encoded in the hyperlink code. If entitlement does not exist, the local computer 150 is redirected to an alternate URL or an entitlement server 110 for additional entitlement verification. Just as the target path is defined in the hyperlink, so too is the connection path to the entitlement server 110.

Calls 210 to an entitlement routine 152 using a hyperlink may occur in one of two ways. First, a pluggable protocol dual interface executable wrapper for the entitlement routine 152 may be included in a standard hyper-text markup language (HTML) HREF or form GET operation in a web page displayed on a browser operated by the local computer 150. Upon the selection of a hyperlink including certain protocol parameters recognized by the entitlement routine 152, the entitlement routine 152 is called 210. Once called 210, the pluggable protocol is registered with the browser of the local computer 150 automatically. Equivalent examples of calls to the executable using either HREF or the form GET operations are given below:

<a href="CSC:ADHello+World; My+Message+
    Box">Say Hello</a>

<form action="CSC:" method="GET">

<input type-hidden
    name="URLData"value="ADHello+World;My+
    Message+Box">

</form>

The "AD" included in the HREF and form GET operation statements is a protocol parameter that operates on the entitlement routine 152. The "AD" in the operational statements illustrated above causes the entitlement routine 152 to display the message that follows the protocol parameter: "Hello World" in this case. The protocol parameter "AD" also displays the message "My Message Box" as the caption for the message box created by the example HREF and form GET operation statements. Additional protocol parameters may also be used within the HREF and form GET operation statements. A list of the protocol parameters available in the entitlement system of the present invention is found in Table I.

TABLE I

| Protocol Parameter | Function | Values |
| --- | --- | --- |
| AA[&] | Run and exit | Executable name; parameter 1; parameter n |
| AB[&] | Run and wait | Executable name; parameter 1; parameter n |
| AC[&] | Open URL | URL |
| AD[&] | Display message | Message Body; Message Caption |
| AF[&] | Reboot | YES/NO (prompt) |
| BC[&] | Update Function | FunctionID; Entitlement String; Error Path |
| BD[&] | Remove Function | FunctionID |
| FA[&] | Register Client | YES/NO (Open entitlement URL or just setup the data) |
| FB[&] | Tag Client | GUID (Customer ID) |
| FC[&] | Tag & Register | GUID; YES/NO |
| FD[&] | Add Cross Reference | Executable Name; FunctionID |
| FF[&] | Decrypt | Encrypted protocol URL or function code |

The optional inclusion of the "&" operator with the protocol parameter in the HREF or form GET statements is represented by the "[&]" in Table I. Inclusion of the "&" operator with the protocol parameter informs the entitlement routine 152 that the statement is hex encoded. For example, the following protocol parameter statements are equivalent, producing the same result:

CSC:ADHello+World;My+Message+Box

CSC:
AD&48656C6C6F2B576F726C643B4D792B4D6573736
167652B426F78

Alternatively, an entitlement system plug-in may be embedded in a web page for each hyperlink associated with the entitlement system. Using an EMBED tag common in HTML programming, the user-desired operation 164 is defined by the FunctionID, calls 210 to the entitlement routine 152 may be made, and URL paths for entitled and nonentitled users may be defined. The form for the EMBED tag used with the entitlement system of the present invention, including the available parameters, is as follows:

<EMBED Type="" name="" Width="" Height=""
    FunctionID="" Target="" URL="" TargetEr-
    ror="" Perform="" Script="">

Each of the parameters in the EMBED tag are further defined in Table II.

FunctionID to the entitlement routine 152 to determine if the local computer 150 or user is entitled to the user-desired operation 164 associated with the FunctionID. Essentially, the check entitlement step 215 is carried out. If the user is entitled to the user-desired operation 164 associated with the FunctionID, the URL "http://www.entitled.com" is loaded in the new browser instance. If the user is not entitled to the user-desired operation 164 associated with the FunctionID, the URL "http://www.notentitled.com" is loaded in the new browser instance. Typically, the URL designated by the TargetError parameter in an EMBED tag directs the user's browser to a URL from which the user may obtain entitlement rights to the user-desired operation 164 represented by the FunctionID.

As noted previously, in those instances where the entitlement routine 152 is not found on the local computer 150 by the call 210 to the entitlement routine 152, an error 212 occurs. Such errors 212 may occur if the entitlement routine 152 does not exist on the local computer 150. Typically, the user may be informed of the error 212 and instructed to load the required entitlement routine 152 before attempting to

TABLE II

| Parameter Name | Function |
| --- | --- |
| Type | Required. Type should always be a string identifying the path to the plug-in to execute. |
| Name | Optional. If using more than one plug-in per page, it is advised to use a unique name for each instance. |
| Width | Optional. The width in pixels of the plug-in window. If omitted, the browser will not draw the plug-in-window as the default value is 0. |
| Height | Optional. The height in pixels of the plug-in window. If omitted, the browser will not draw the plug-in-window, as the default value is 0. |
| FunctionID | Optional. An eight-digit hexadecimal value that represents the user-desired operation or function. |
| Target | Optional. The target frame for the redirection function. Possible values include: "_new", "_self", "_top", "_blank", and "_parent". If "_self" is used, the meta tag with the following parameters must also be used: <META http-equiv="REFRESH" content="1"; URL="document.location">. If the Target parameter is omitted, the redirection will occur in a new window, as "_new" is the default. |
| URL | Optional. The default path the plug-in should direct the browser to if the user is entitled to the application or function in question. |
| TargetError | Optional. The TargetError parameter allows the target to be specified for the ErrorPath. If omitted, the Target parameter is used for ErrorPath URLs. This allows the plug-in to redirect to different targets for valid and invalid entitlements. |
| Perform | Optional. This parameter is used to give special commands to the entitlement routine DLL. The plug-in will redirect to the URL parameter upon successful completion of the perform function. All other EMBED tags are ignored. "YYZ" is the Perform code for GetUserData which queries the entitlement routine DLL for CSC 4 point GUID and redirects to URL path parameter with the GUID in query string as the "data" parameter. Additional Perform codes may be customized based upon user, customer, business, or other needs. |
| Script | Optional. The Script parameter passes scripts along to the entitlement routine DLL. If the Script parameter is used, the CheckFunctionCSC function is called in the entitlement routine DLL. |

A representative example of valid call 210 to an entitlement routine using the EMBED tag for the entitlement system of the present invention follows:

<EMBED Type="application/x-ConnectedSupport-
    plugin" name="csc1" Width="400"
    Height="50" FunctionID="00001012"
    Target="_new" URL="http://www.entitled.com"
    TargetError="http://www.notentitled.com"
    Perform="YYZ">

Selection of a hyperlink associated with the representative EMBED tag opens a new browser instance and passes the access the selected user-desired operation again. Alternatively, the error 212 may connect the local computer 150 to an entitlement server 110 to retrieve the required entitlement routine 152. Instead of being connected to an entitlement server 110, the error 212 may connect the local computer 150 to a commerce engine 140 offering the selected user-desired operation 164. The user would then have the opportunity to obtain entitlement rights to the selected user-desired operation 164 and download the entitlement routine 152 therefrom.

The check entitlement step 215 of the present invention identifies the user-desired operation for which entitlement is sought and determines the entitlement status from entitlement keys stored in the system registry of the local computer 150. The substeps involved in the check entitlement 215 process are illustrated in the block diagram of FIG. 3. These substeps may be called by entitlement routine 152 functions. For example, the CheckEntitlement function or CheckEntitlementCSC function is typically used to determine the status of entitlement keys.

The CheckEntitlement function of the entitlement routine 152 is called 260 and the FunctionID of the user-desired operation is passed to the CheckEntitlement function. Based upon the FunctionID, the CheckEntitlement function queries 262 the system registry of the local computer 150 for entitlement keys associated with the FunctionID. Typically, the entitlement keys are stored in a directory or folder bearing the FunctionID as a directory name. If entitlement keys are not found for the selected user-desired operation, the local computer 150 is redirected to an entitlement server 110. If entitlement keys for the selected user-desired operation are found, the entitlement routine queries 264 the system registry for the public key used to decrypt the entitlement keys. Generally, the public key is also encrypted. The entitlement routine uses the machine identification and/or GUID to decrypt the public key. Once the public key is retrieved, the entitlement keys are decrypted 266. If the entitlement keys are valid, the user-desired operation is executed on the local computer 150. If the entitlement keys are not valid, the user is redirected to the entitlement server 110, such as by calling the RedirectPath function 200 of the entitlement routine 152.

The CheckEntitlement function 260 determines validation or invalidation 268 from the entitlement key. Typically, the entitlement key is a twelve-digit hex value wherein the different hex values represent different portions of the entitlement key. For example, the first four hex values may represent the duration that the entitlement keys are to remain valid. The next three hex values independently represent the scale for renewing entitlement rights, the grace period allowed before rights are denied, and the timing for the next optional scheduled update to the entitlement routine or to the entitlement keys. Using this entitlement record structure, the entitlement rights may be granted for brief, or long, durations of time, or until some event occurs.

Referring again to FIG. 2, if the entitlement routine 152 determines that the local computer 150 is entitled to the selected user-desired operation, the user-desired operation is executed 290. If entitlement does not exist, the user, or local computer 150, is redirected 220 to the entitlement server 110.

Once redirected to the entitlement server 110, the GetUserData function 225 of the entitlement routine 152 is executed. The GetUserData function 225 retrieves necessary information from the local computer 150 to identify the local computer 150 and possibly the user of the local computer 150. Typically, the data obtained by the GetUserData function includes the information that is stored in a user record by the entitlement routine.

Having obtained the user data, a user record having the information retrieved by the GetUserData function 225 is compared to data in a user database 227. Entitlement to the user-desired operation is then determined from the information in the user database. If the user is not entitled to the user-desired operation, an error 214 occurs. If the user, or local computer 150, is entitled to the user-desired operation, new entitlement keys are generated 240, encrypted 242, transmitted 244 to the local computer 150, and stored 246 in the system registry of the local computer 150. The connection between the entitlement server 110 and the local computer 150 is then disconnected and the user-desired operation is executed 290.

Error 214, produced by an entitlement server 110 unable to verify entitlement of a selected user-desired operation, informs the user of the local computer 150 that the local computer 150 is not entitled to operate the selected user-desired operation. Connection with the entitlement server 110 is then terminated. In addition, error 214 may redirect or connect the local computer 150 with a commerce engine 140, or other computer, offering entitlement rights to the selected user-desired operation. The user may then choose whether or not to obtain entitlement rights to the user-desired operation from the commerce engine 140. If the user chooses to obtain entitlement rights, the local computer 150 is provided with the entitlement routine and entitlement keys. Typically, the entitlement keys will be generated, encrypted, transmitted, and stored on the system registry of the local computer 150 after entitlement rights have been obtained.

Typical use of an embodiment of the entitlement system of the present invention is described in the following example. A user accessing a local computer 150 connects to the Internet 130 and directs the local computer's 150 web browser to a remote computer 160 hosting hyperlinks to user-desired operations 164. The user browses the user-desired operations 164 and selects the hyperlink associated with a user-desired operation, for example, a game program. The hyperlink associated with the selected user-desired operation executes the following EMBED tag:

```
<EMBED Type="application/x-ConnectedSupport-
    plugin" name="csc1" Width="400"
    Height="50" FunctionID="00001012"
    Target="_new" URL="http://www.game.com"
    TargetError="http://www.entitlementserver-
    .com">
```

The FunctionID is passed to the local computer 150. However, because the local computer 150 is not yet associated with the entitlement system of the present invention, no entitlement keys for the user-desired operation exist within the system registry of the local computer 150. Thus, the EMBED tag commands connect the local computer 150 to an entitlement server 110 in a new browser window. As defined in the EMBED tag, the entitlement server 110 URL is "http://www.entitlementserver.com".

Now connected to the entitlement server 110, the user is informed of the association of the game program with the entitlement system of the present invention. The user is prompted to obtain entitlement rights to the game program. The user, wishing to play the game, agrees and informs the entitlement server 110 of the user's desire to obtain entitlement rights. The entitlement server 110 prompts the user for some basic data, such as the user's name. The entitlement server 110 also retrieves from the local computer 150 the GUID associated with the local computer 150 and the machine identification of the local computer 150. The entitlement server 110 stores this information, along with the FunctionID of the user-desired operation obtained from the remote computer 160. The entitlement server 110 transmits an entitlement routine to the local computer 150 where it is stored for future use. For example, the entitlement routine includes the following functions: Perform, CheckEntitlement, CheckEntitlementCSC, RedirectPath, UpdateFunction, RemoveFunction, and GetUserData.

The local computer 150 is then directed to a commerce engine 140 where the user may obtain entitlement rights to the game program. Through the web browser, the commerce engine 140 informs the user that the game program may be downloaded and operated locally on the user's local computer 150 as an alternative to playing the game program over the Internet. The user, who pays a substantial amount of money to access the Internet, prefers this option and selects to purchase a two-month (by way of example only) license for the game program. The commerce engine 140 prompts the user with payment options as known in the art and transmits the game program to the local computer 150 where it is stored on the local computer's hard drive. The commerce engine 140 then disconnects contact with the local computer 150.

The commerce engine 140 transmits to the entitlement server 110 the FunctionID of the game program, the expiration date of the user's license for the game program, and the user's name and data. The entitlement server 110 stores the expiration date of the license for the user-desired operation associated with the FunctionID with the user data retrieved and stored earlier.

Having downloaded the game program, the user installs and attempts to execute the game program locally on the local computer 150. Because the game program is associated with the entitlement system of the present invention, the game program first calls the entitlement routine to verify the user's entitlement to the game program. The FunctionID of the game program is passed to the CheckEntitlement function of the entitlement routine. The CheckEntitlement function searches the system registry of the local computer 150 for entitlement keys specific to the game program. However, the entitlement keys have not yet been stored on the local computer 150. The CheckEntitlement function therefore executes the RedirectPath function of the entitlement routine. This function connects the local computer 150 to the entitlement server 110 and passes the FunctionID of the game program to the entitlement server 110. The entitlement server 110 invokes the GetUserData function of the entitlement routine on the local computer 150 to retrieve the user name, machine identification and GUID from the local computer 150. Using the FunctionID and user information, the entitlement routine 110 searches its databases to determine if the user has entitlement rights to the game program. Finding the user information in the entitlement server 110 databases, the entitlement server 110 invokes the UpdateFunction of the entitlement routine using the FunctionID for the game program. The UpdateFunction generates, encrypts, and transmits entitlement keys for the game program to the local computer 150. Because the user purchased a two-month license for the game program, the entitlement keys reflect a duration of two months, after which time the entitlement keys expire. The entitlement keys are stored in the system registry of the local computer 150. Once stored, the connection with the entitlement server 110 is disabled and the game program is launched.

Over the next two months, the user is able to operate and play the game program on the user's local computer because proper entitlement keys exist. After the two-month expiration date, the user is again redirected to the entitlement server 110 to purchase additional rights to the game program or remove the entitlement information from the local computer 150. In this manner, the user may continue to obtain one-month (or other time period) licenses for the game program using the entitlement system of the present invention.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method of validating access to a computer-controlled operation upon selection of a user controlled operation by a user of a local computer, including:
   contacting an entitlement server when the computer-controlled operation is not entitled;
   providing the entitlement server with a global unique identifier for the local computer;
   accessing a user information database accessible to the entitlement server for determining validity of an entitlement key retrieved from a system registry of the local computer associated with the global unique identifier for the local computer; and
   enabling execution of the computer-controlled operation if the entitlement key is valid.

2. The method of validating access of claim 1, further comprising storing an entitlement routine on the local computer as a dynamic link library file on the local computer.

3. The method of validating access of claim 1, further comprising storing an entitlement routine on the local computer for accessing at least one entitlement key stored on the local computer and evaluating the validity of the at least one entitlement key.

4. The method of validating access of claim 1, further comprising storing at least one entitlement key in a system registry of the local computer.

5. The method of validating access of claim 4, wherein the storing the at least one entitlement key in a system registry of the local computer further comprises storing the at least one entitlement key in a directory of the system registry corresponding to a unique identifier for the user-controlled operation.

6. The method of validating access of claim 4, wherein the storing the at least one entitlement key in a system registry of the local computer further comprises storing the at least one entitlement key in an encrypted form in the system registry of the local computer.

7. The method of validating access of claim 1, further comprising storing the computer-controlled operation in computer readable format accessible to the local computer.

8. The method of validating access of claim 1, further comprising storing the computer-controlled operation on a remote computer accessible to the local computer.

9. The method of validating access of claim 8, wherein the storing the computer-controlled operation on a remote computer accessible to the local computer comprises storing a hyperlink on the remote computer for linking to the computer-controlled operation upon validation of at least one entitlement key associated with the computer-controlled operation.

10. The method of validating access of claim 1, further comprising:
   generating a new entitlement key for the computer-controlled operation;
   encrypting the new entitlement key using a public key stored on the entitlement server;
   transmitting the new entitlement key to the local computer;
   storing the new entitlement key in a system registry of the local computer; and
   executing the computer-controlled operation.

11. The method of validating access of claim 1, wherein the contacting an entitlement server further comprises contacting the entitlement server to obtain updated entitlement information when the computer-controlled operation is not entitled.

12. The method of validating access of claim 1, wherein the contacting an entitlement server further comprises creating an entitlement profile for a user.

13. The method of validating access of claim 1, wherein the user information database includes at least one of a user name, an account number, a network global unique identifier and a machine identifier.

14. The method of validating access of claim 1, wherein the determining validity of an entitlement key is based at least in part on at least one of a maximum number of clients allowed, a FunctionID for a user-desired operation, and an expiration date for entitlement of the computer-controlled operation.

15. The method of validating access of claim 1, wherein the contacting an entitlement server further comprises calling an entitlement routine to obtain information to determine the computer-controlled operation is not entitled.

16. The method of validating access of claim 15, wherein the entitlement routine is called in response to selection of a web-based hyperlink.

17. The method of validating access of claim 16, wherein the web-based hyperlink calls the entitlement routine and passes user information to determine access to the computer-controlled operation.

* * * * *